(12) United States Patent
Douady et al.

(10) Patent No.: US 11,501,418 B2
(45) Date of Patent: Nov. 15, 2022

(54) MULTI-LEVEL LOOKUP TABLES FOR CONTROL POINT PROCESSING AND HISTOGRAM COLLECTION

(71) Applicant: GoPro, Inc., San Mateo, CA (US)

(72) Inventors: Bruno César Douady, Orsay (FR); Guillaume Matthieu Guérin, Chatillon (FR)

(73) Assignee: GoPro, Inc., San Mateo, CA (US)

( * ) Notice: Subject to any disclaimer, the term of this patent is extended or adjusted under 35 U.S.C. 154(b) by 138 days.

(21) Appl. No.: 17/140,287

(22) Filed: Jan. 4, 2021

(65) Prior Publication Data

US 2021/0125319 A1    Apr. 29, 2021

Related U.S. Application Data

(63) Continuation of application No. 16/412,829, filed on May 15, 2019, now Pat. No. 10,885,615.

(60) Provisional application No. 62/748,038, filed on Oct. 19, 2018.

(51) Int. Cl.
*G06T 5/00* (2006.01)
*G06T 3/40* (2006.01)
*G06T 7/13* (2017.01)

(52) U.S. Cl.
CPC ............ *G06T 5/009* (2013.01); *G06T 3/4007* (2013.01); *G06T 5/002* (2013.01); *G06T 7/13* (2017.01)

(58) Field of Classification Search
CPC ....... G06T 1/60; G06T 3/0012; G06T 3/0093; G06T 3/4007; G06T 5/009; G06T 5/10; G06T 5/40; G06T 7/11; G06T 7/13; G06T 7/168; G06T 2207/20012; G06T 2207/20021; G06F 12/0207; G06F 12/0292
See application file for complete search history.

(56) References Cited

U.S. PATENT DOCUMENTS

| 6,185,007 | B1 | 2/2001 | Hayashi et al. ............... 358/1.9 |
| 10,885,615 | B2 | 1/2021 | Douady et al. .......... G06T 5/009 |
| 2016/0180501 | A1 | 6/2016 | Mallet ..................... G06T 5/006 |
| 2017/0206689 | A1 | 7/2017 | Eo et al. ................ H04N 9/646 |
| 2020/0126196 | A1 | 4/2020 | Douady et al. .......... G06T 5/009 |

*Primary Examiner* — Andrew W Johns
(74) *Attorney, Agent, or Firm* — Young Basile Hanlon & MacFarlane, P.C.

(57) ABSTRACT

Multiple lookup tables (LUTs) storing different numbers of control point values are used to process pixels within different blocks of an image, such as after image processing using tone mapping and/or tone control, and/or to collect histogram information or implement 3D LUTs. First control point values stored within a first LUT are applied against pixels of a given block of an image to produce a distorted image block. Second control point values stored within a second lookup table are applied against a pixel of the distorted image block to produce a processed pixel. The second LUT is one of a plurality of second LUTs and stores fewer values than the first LUT. A processed image is produced using the processed pixel. The processed image is then output for further processing or display.

20 Claims, 8 Drawing Sheets

MULTI-LEVEL LOOKUP TABLES FOR CONTROL POINT PROCESSING AND HISTOGRAM COLLECTION

CROSS REFERENCE TO RELATED APPLICATION(S)

This application is a continuation of U.S. application Ser. No. 16/412,829, filed on May 15, 2019, which claims priority to and the benefit of U.S. Provisional Application Patent Ser. No. 62/748,038, filed Oct. 19, 2018, the entire disclosures of which are herein incorporated by reference.

TECHNICAL FIELD

This disclosure relates to using multi-level lookup tables (LUTs) for control point processing and histogram collection.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be processed and then stored or output. Combinations of red, green, and blue color components are used to create colors for pixels of the image. The amounts of each of those color components used to create the colors for the pixels represent the intensity levels of the respective colors for those pixels.

SUMMARY

This disclosure describes, inter alia, systems and techniques for using multi-level LUTs for control point processing and histogram collection.

One aspect of this disclosure is an image capture apparatus. The image capture apparatus comprises an image sensor, a processor, and a memory. The image sensor is configured to capture an image. The memory includes instructions executable by the processor. The instructions include instructions to divide the image into a plurality of blocks including a given block in which the given block includes pixels, apply first control point values against at least some of the pixels of the given block to produce a distorted image block in which the first control point values are stored within a first lookup table, determine a histogram bin precision for pixels of the distorted image block based on a value distribution of the distorted image block, select a second lookup table from a plurality of second lookup tables based on the histogram bin precision in which the second lookup table storing fewer control point values than the first lookup table, apply second control point values against a pixel of the distorted image block to produce a processed pixel in which the second control point values is stored within the second lookup table, produce a processed image using the processed pixel in which the processed image corresponds to the image captured using the image sensor, and output the processed image for storage or display.

Another aspect of this disclosure is an image processor. The image processor comprises a first unit, a second unit, and a third unit. The first unit is configured to capture an image. The second unit is configured to perform image processing against the image to divide the image into blocks including pixels. The third unit is configured to apply control point values stored within lookup tables to at least some pixels of at least some of the blocks to produce a processed image. For a given block of the blocks, the third unit is configured to apply first control point values stored within a first lookup table against one or more pixels of the given block to produce a distorted image block. The third unit is configured to apply second control point values stored within a second lookup table against a pixel of the distorted image block to produce a processed pixel, wherein the second control point values includes fewer values than the first control point values, and wherein the second lookup table is selected based on a histogram bin precision for the pixels of the distorted image block. The second lookup table is one of a plurality of second lookup tables. Different second lookup tables are used for different blocks of the blocks, such that the blocks are processed using the first lookup table and a corresponding one of the plurality of second lookup tables. The processed image is produced using the processed pixel.

Another aspect of this disclosure is a method. The method comprises dividing an image into a plurality of blocks including a given block, producing a distorted image block by applying first control point values against pixels of the given block in which the first control point values are stored within a first lookup table, producing a processed block by applying second control point values against the pixels of the distorted image block in which the second control point values are stored in a second lookup table selected based on a histogram bin precision for the distorted image block, and producing a processed image based on the processed block.

These and other aspects of this disclosure are disclosed in the following detailed description, the appended claims, and the accompanying figures.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

Figure 1A:
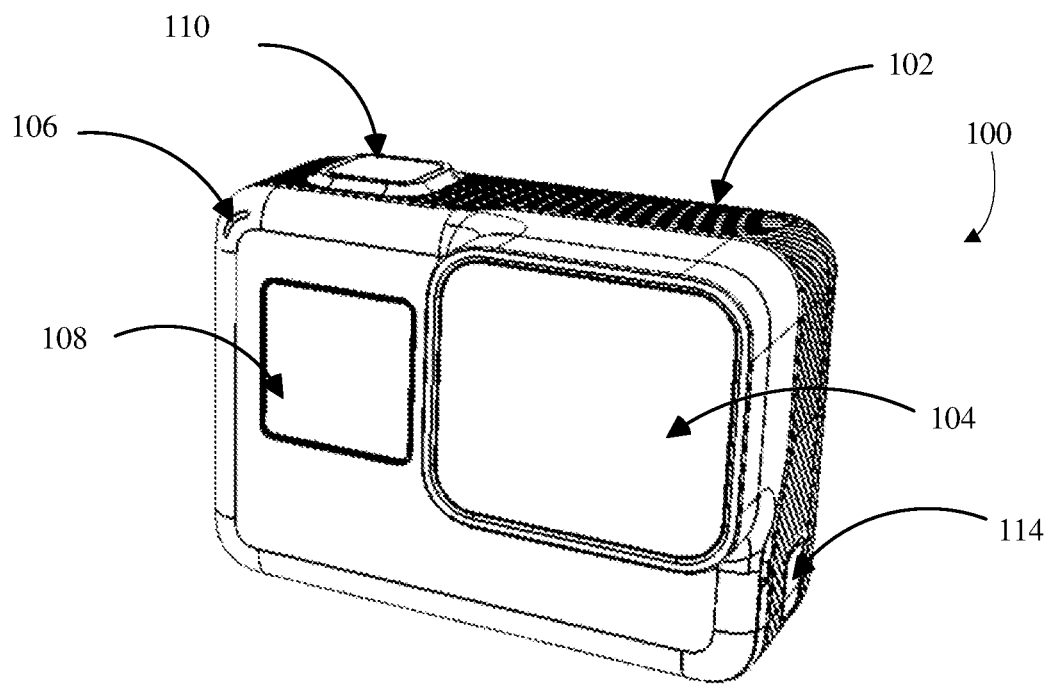
FIGS. 1A-D are isometric views of an example of an image capture device.
Figure 1B:
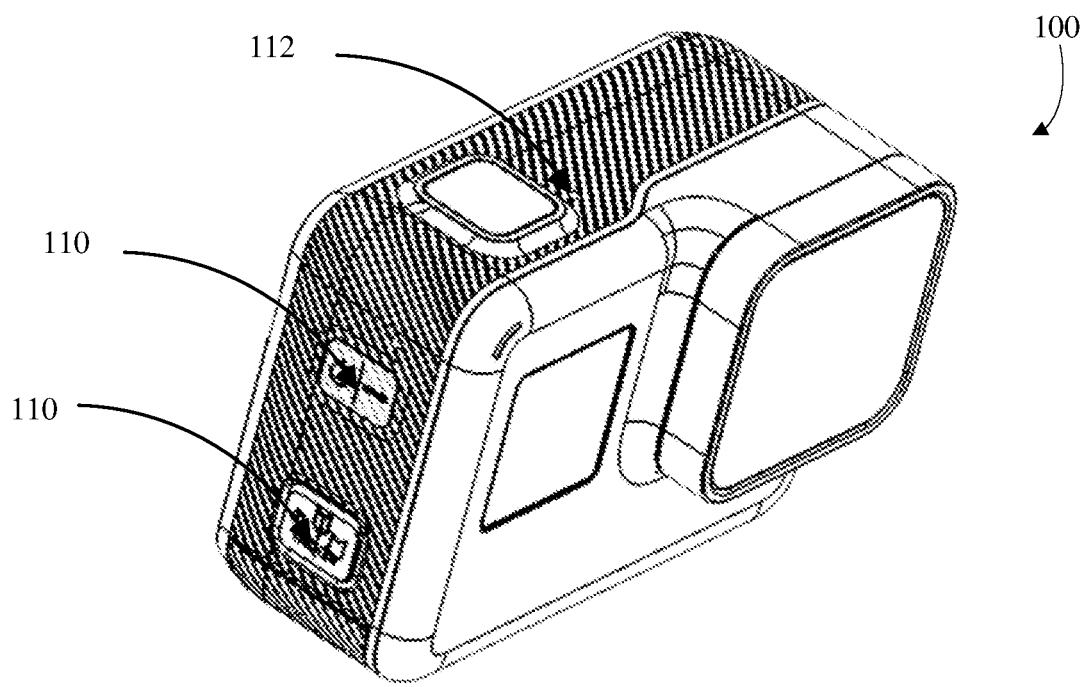
Figure 1C:
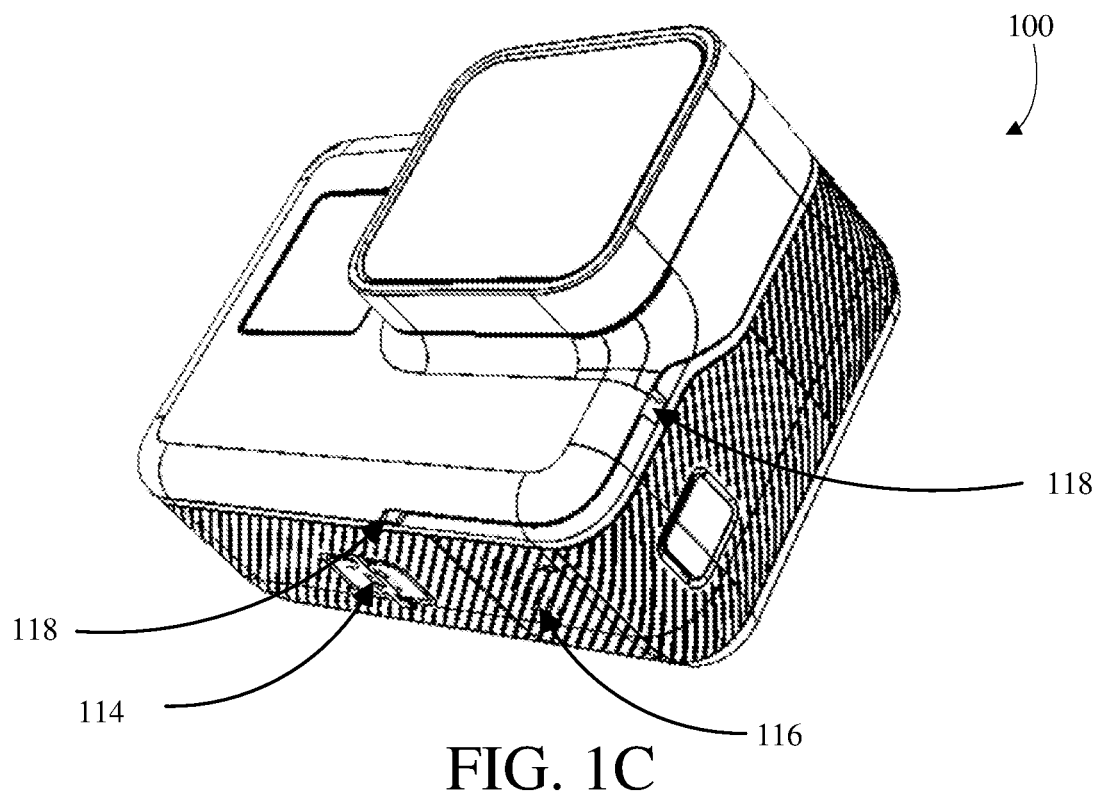
Figure 1D:
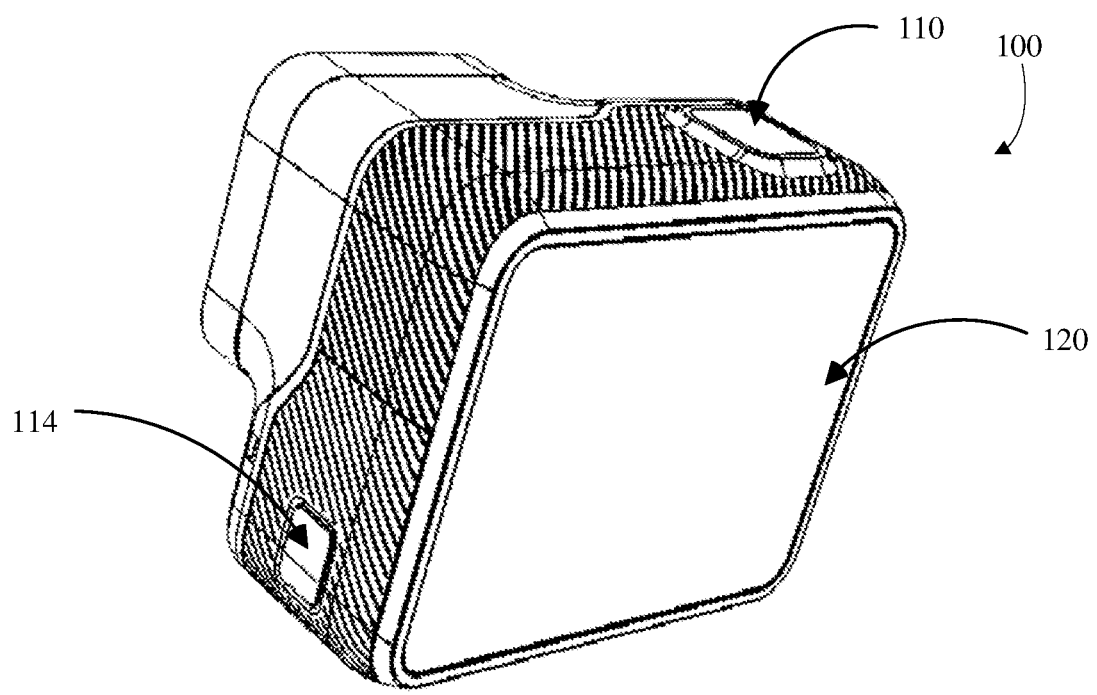

In the context of image processing, a LUT is typically used to modify values related to an image captured using an ISP. Depending on the number of values stored within the LUT, the use of the LUT to process an image can require a significant amount of computing resources (e.g., processing and memory resources spent on instructions, camera control statements, etc.). For example, field variable LUTs (e.g., LUTs for which the content varies depending on where the pixel is located) may use a large number of values to represent specific frequency information within some or all blocks of an image. In another example, 3D LUTs, which map one color space to another, may use a large number of values for that mapping.

The cost to use a LUT is based on the number of values, such as control point values, stored within the LUT. In conventional image processing approaches, LUTs are specified with constant steps in an X-axis direction (e.g., by a power of two), and the content of the LUTs is limited to Y-axis values. Steps through the X-axis direction are thus constant throughout the entire X-axis range. As a result, in cases where precise control is necessary in a given subrange of the possible X-axis values, the steps through the entire X-axis range must be small. In many such cases, however, those control points may be unnecessarily evenly distributed throughout the input range.

As an example, precise control is important for dark values within an image. For an input range of 0-999 in which precise control is necessary or desired when X<100 (e.g., for a control point every 10 values), but only loose control is necessary or desired when X>100 (e.g., for a control point every 100 values), an optimal LUT would use 20 control points (e.g., with X values of 0, 10, 20, 30, 40, 50, 60, 70, 80, 90, 100, 200, 300, 400, 500, 600, 700, 800, 900, and 1,000). However, a constant step LUT would use 101 control points (e.g., with X values of 0, 10, 20, . . . , 90, 100, 110, 120, . . . , 980, 990, 1,000) to guarantee the correct precision level in the subrange of 0-100.

The same concept is true for histogram collection. It may be desirable to have a precise histogram in the subrange of 0-100 (e.g., a bin every 10 values) or a loose histogram in the subrange above 100; however, a constant step histogram collector will necessitate 100 bins (e.g., 0, 10, 20, . . . , 90, 100, 110, 120, . . . , 980, 990, 1,000) instead of 19 (e.g., 0-9, 10-19, . . . 80-89, 90-99, 100-199, 200-299, . . . , 800-899, 900-999).

In terms of memory and processing requirements, the cost of a LUT is directly associated with the number of control points it uses, and the cost of a histogram is directly associated with the number of bins it uses. As mentioned above, LUTs used in conventional image processing may include a large number of control point values. Thus, the use of such a LUT or histogram to process an image may thus be very costly. Where the image is one frame of a video sequence and each frame is processed using a different LUT or histogram, the total cost to process the video sequence can require a substantial amount of computing resources, which may otherwise be used elsewhere in the image or video pipeline.

Implementations of this disclosure address problems such as these using multi-level LUTs for control point processing and histogram collection. Data associated with an image block is used to query a first LUT. The first LUT stores control point values corresponding to all pixel values within the image, whether dark or bright. The control point values of the first LUT are used to produce a distorted image block for a given image block, such as by processing pixel information within that given image block. The distorted image block is used to query a second LUT, which stores control point values corresponding to image block. In particular, the first LUT stores a distorted value for each pixel of the image, such that, in the distorted space, control point values for the second LUT are evenly distributed. The control point values of the second LUT are applied to the distorted image block to produce a processed image block. The processed image block is combined with other processed image blocks to produce a processed image. The processed image is then output or stored.

The implementations of this disclosure present improvements in computing technology by using multi-level LUTs for control point processing and histogram collection. For example, in the context of image processing, the implementations of this disclosure substantially reduce the cost to process an image. For example, rather than using a single LUT storing the thousands of control point values for each block of the image, a single first level LUT stores those thousands of control point values. Each second level LUT corresponds to one of the blocks of the image. The second level LUT for a given block includes control points for the entire input range, but, in the distorted space resulting from the use of the first level LUT, only a few of those control points are necessary for processing the given block.

Conventional image processing uses a single LUT storing a large number of parameters for each of the blocks in an image. The total cost to use that single LUT to process an image can be expressed as Cost=A*B, where A is the number of necessary control point values in the input range with variable steps and B is the number of blocks within the image. Using the implementations of this disclosure, the total cost to process an image can be expressed as Cost=A+(N*B), where N is the number of blocks in the image, A is the number of necessary control points in the first input range with variable steps, and B is the number of necessary control points in the second input range with variable steps. As such, where the input uses 1,024 control point values, the image includes 48 block, and each block uses 64 control point values, the total cost using conventional image processing is 49,152, whereas the total cost using the implementations of this disclosure is 4,096.

The implementations of this disclosure are described with reference to image data. However, the implementations of this disclosure may be used for data other than image data. For example, the values stored within the first level LUT and each of the second level LUTs may correspond to data other than image data. The use of multi-level LUTs for control point processing and histogram collection thus represents an improvement in computing technology that can benefit a number of industries and data types.

The implementations of this disclosure are described in detail with reference to the drawings, which are provided as examples so as to enable those skilled in the art to practice the technology. The figures and examples are not meant to limit the scope of this disclosure to a single implementation, and other implementations are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video, and to store captured images and video for subsequent display or playback.

The image capture device 100 can include various indicators, including the LED lights 106 and the LED display 108. The image capture device 100 can also include buttons 110 configured to allow a user of the image capture device 100 to interact with the image capture device 100, to turn the image capture device 100 on, and to otherwise configure the operating mode of the image capture device 100. The image capture device 100 can also include a microphone 112 configured to receive and record audio signals in conjunction with recording video. The side of the image capture device 100 may include an I/O interface 114.

The camera may also include a microphone 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the image capture device 100 may include a lens 104 configured to receive light incident upon the lens and to direct received light onto an image sensor internal to the lens.

The image capture device 100, includes a camera exterior that encompasses and protects the camera's internal electronics, which are further described in later sections. The camera exterior includes six surfaces (i.e. a front face, a left face, a right face, a back face, a top face, and a bottom face), wherein the exterior surfaces form a rectangular cuboid. Furthermore, both the front and rear surfaces of the image capture device 100 are substantially rectangular in shape. The image capture device 100 can be made of a rigid material such as plastic, aluminum, steel, or fiberglass.

Additional camera features, such as the features described above, may be affixed to an exterior of the camera. In some implementations, the camera described herein includes features other than those described below. For example, instead of a single interface button, the camera can include additional buttons or different interface features, such as a multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, in some implementations, the image capture device 100 may include one or more microphones, which may receive, capture, and record audio information, which may be associated with images acquired by the image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

Figure 3:
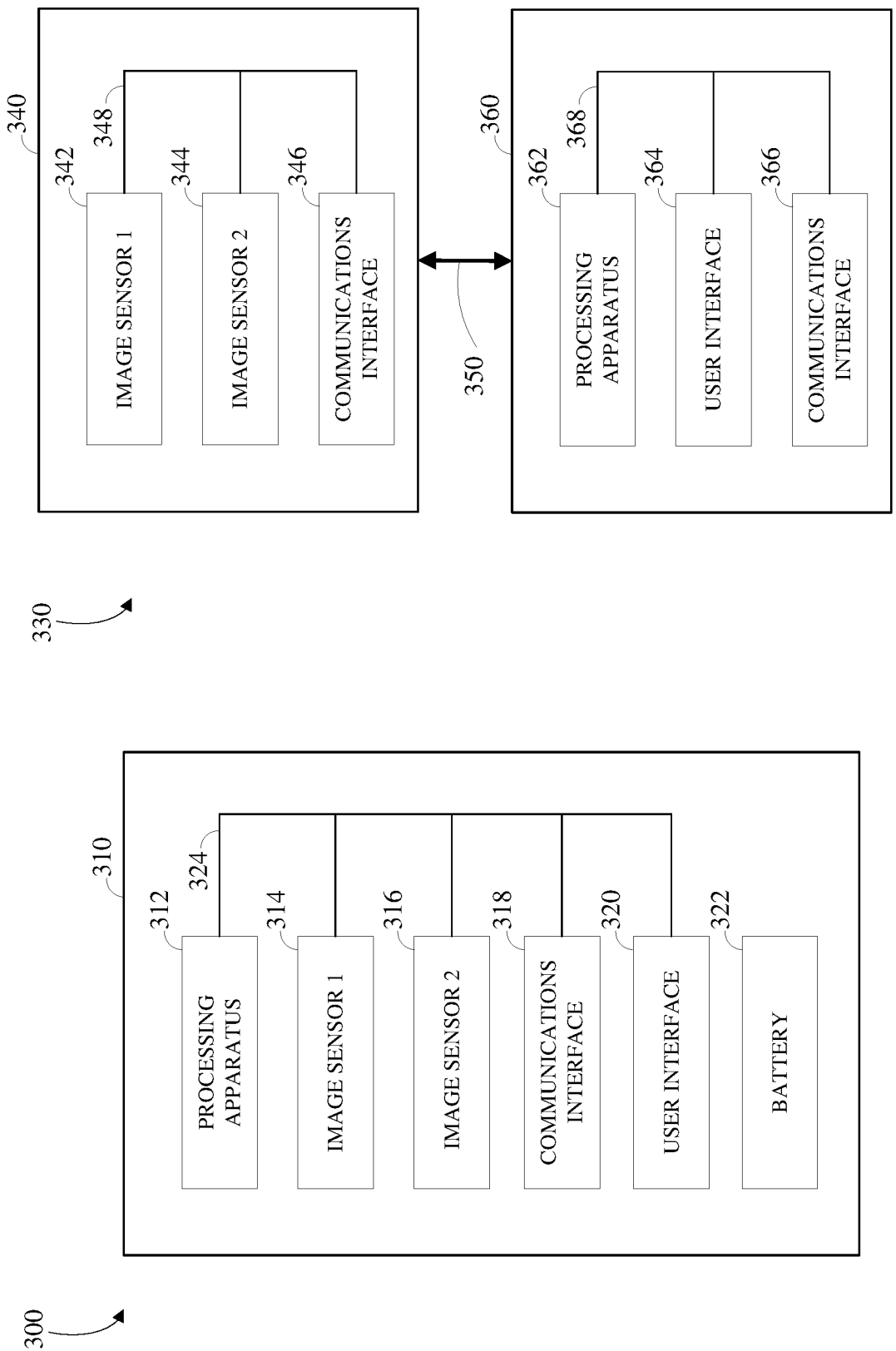
FIGS. 3A-B are block diagrams of examples of systems configured for image capture.

In some implementations, the image capture device 100 may interface with or communicate with an external device, such as an external user interface device, via a wired or wireless computing communication link (not shown). The user interface device may, for example, be the personal computing device 360 described below with respect to FIG. 3. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the image capture device 100 may transmit images, such as panoramic images, or portions thereof, to the user interface device (not shown) via the computing communication link, and the user interface device may store, process, display, or a combination thereof the panoramic images.

In some implementations, the user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

In some implementations, the user interface device may display, or otherwise present, content, such as images or video, acquired by the image capture device 100. For example, a display of the user interface device may be a viewport into the three-dimensional space represented by the panoramic images or video captured or created by the image capture device 100.

In some implementations, the user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

In some implementations, the user interface device may implement or execute one or more applications to manage or control the image capture device 100. For example, the user interface device may include an application for controlling camera configuration, video acquisition, video display, or any other configurable or controllable aspect of the image capture device 100.

In some implementations, the user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

In some implementations, the user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

In some implementations, the user interface device, such as via an application, may display, or otherwise present, marks or tags associated with images or video, such as in response to user input. For example, marks may be presented in a camera roll application for location review and/or playback of video highlights.

In some implementations, the user interface device, such as via an application, may wirelessly control camera software, hardware, or both. For example, the user interface device may include a web-based graphical interface accessible by a user for selecting a live or previously recorded video stream from the image capture device 100 for display on the user interface device.

In some implementations, the user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
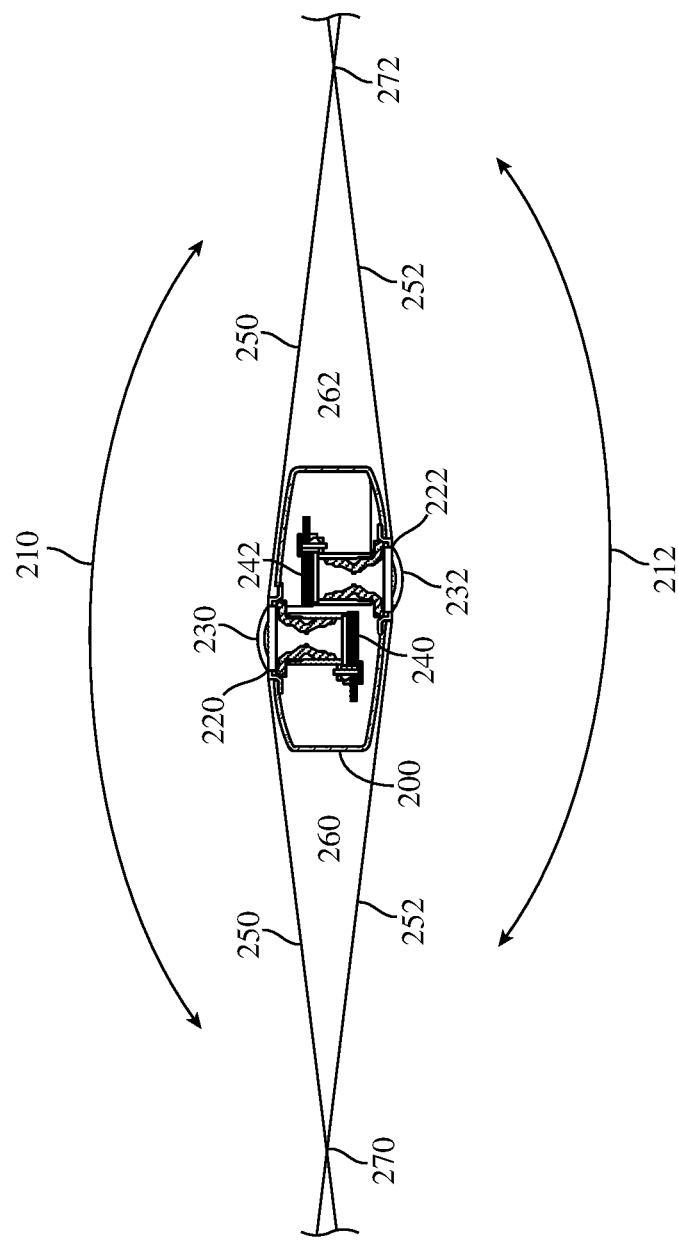
FIG. 2 is a cross-sectional view of an example of an image capture device including overlapping fields-of-view.

FIG. 2 is a cross-sectional view of an example of a dual-lens image capture device 200 including overlapping fields-of-view 210, 212. In some implementations, the image capture device 200 may be a spherical image capture device with fields-of-view 210, 212 as shown in FIG. 2. For example, the image capture device 200 may include image capture devices 220, 222, related components, or a combination thereof, arranged in a back-to-back or Janus configuration. For example, a first image capture device 220 may include a first lens 230 and a first image sensor 240, and a second image capture device 222 may include a second lens 232 and a second image sensor 242 arranged oppositely from the first lens 230 and the first image sensor 240.

The first lens 230 of the image capture device 200 may have the field-of-view 210 shown above a boundary 250. Behind the first lens 230, the first image sensor 240 may capture a first hyper-hemispherical image plane from light entering the first lens 230, corresponding to the first field-of-view 210.

The second lens 232 of the image capture device 200 may have a field-of-view 212 as shown below a boundary 252. Behind the second lens 232, the second image sensor 242 may capture a second hyper-hemispherical image plane from light entering the second lens 232, corresponding to the second field-of-view 212.

One or more areas, such as blind spots 260, 262, may be outside of the fields-of-view 210, 212 of the lenses 230, 232, light may be obscured from the lenses 230, 232 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 230, 232, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A small change in the alignment, such as position and/or tilt, of the lenses 230, 232, the image sensors 240, 242, or both may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 230, 232 and the image sensors 240, 242 such that the fields-of-view 210, 212, stitch points 270, 272, or both may be accurately determined, which may improve the accuracy, efficiency, or both of generating a combined image.

Optical axes through the lenses 230, 232 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 230, 232, such that the image sensors may be perpendicular to the respective axes to within a tolerance such as 1%, 3%, 5%, 10%, and/or other tolerances.

The lenses 230, 232 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 230, 232 may include substantially reduced thickness relative to the lengths of the lens barrels securing the lenses 230, 232. For example, the overall thickness of the image capture device 200 may be close to the length of a single lens barrel as opposed to twice the length of a single lens barrel as in a back-to-back configuration. Reducing the lateral distance between the lenses 230, 232 may improve the overlap in the fields-of-view 210, 212.

Images or frames captured by an image capture device, such as the image capture device 100 shown in FIGS. 1A-D or the image capture device 200 shown in FIG. 2, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of systems configured for image capture. Referring first to FIG. 3A, an image capture device 300 configured for image capture is shown. The image capture device 300 includes an image capture device 310 (e.g., a camera or a drone), which may, for example, be the image capture device 100 shown in FIGS. 1A-D. The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316.

The image capture device 310 includes a communications interface 318 for transferring images to other devices. The image capture device 310 includes a user interface 320, which may allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 are configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The image capture device 310 may include a communications interface 318, which may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The image capture device 310 may include a user interface 320. For example, the user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures. The image capture device 310 may include a battery 322 that powers the image capture device 310 and/or its peripherals. For example, the battery 322 may be charged wirelessly or through a micro-USB interface.

In some implementations, the image capture device 310 may include one or more hardware or software components for performing global tone mapping against pixels of an image captured using the image capture device 310. The global tone mapping performed using those one or more hardware or software components may integrate color correction operations. For example, those one or more hardware or software components may be used to perform the technique 1200 described below with respect to FIG. 12.

Referring next to FIG. 3B, a system 330 configured for image capture is shown. The system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D. The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor, and receive a second image from the second image sensor 344. The processing apparatus 362 may be configured to perform image signal processing (e.g., filtering, tone mapping, stitching, and/or encoding) to generate output images based on image data from the image sensors 342 and 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via the bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via the bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or snap photograph) received via the user interface 364 may be passed on to the image capture device 340 via the communications link 350.

In some implementations, the image capture device 340 and/or the personal computing device 360 may include one or more hardware or software components for performing global tone mapping against pixels of an image captured using the image capture device 340. The global tone mapping performed using those one or more hardware or software components may integrate color correction operations. For example, those one or more hardware or software components may be used to perform the technique 1200 described below with respect to FIG. 12.

Figure 4:
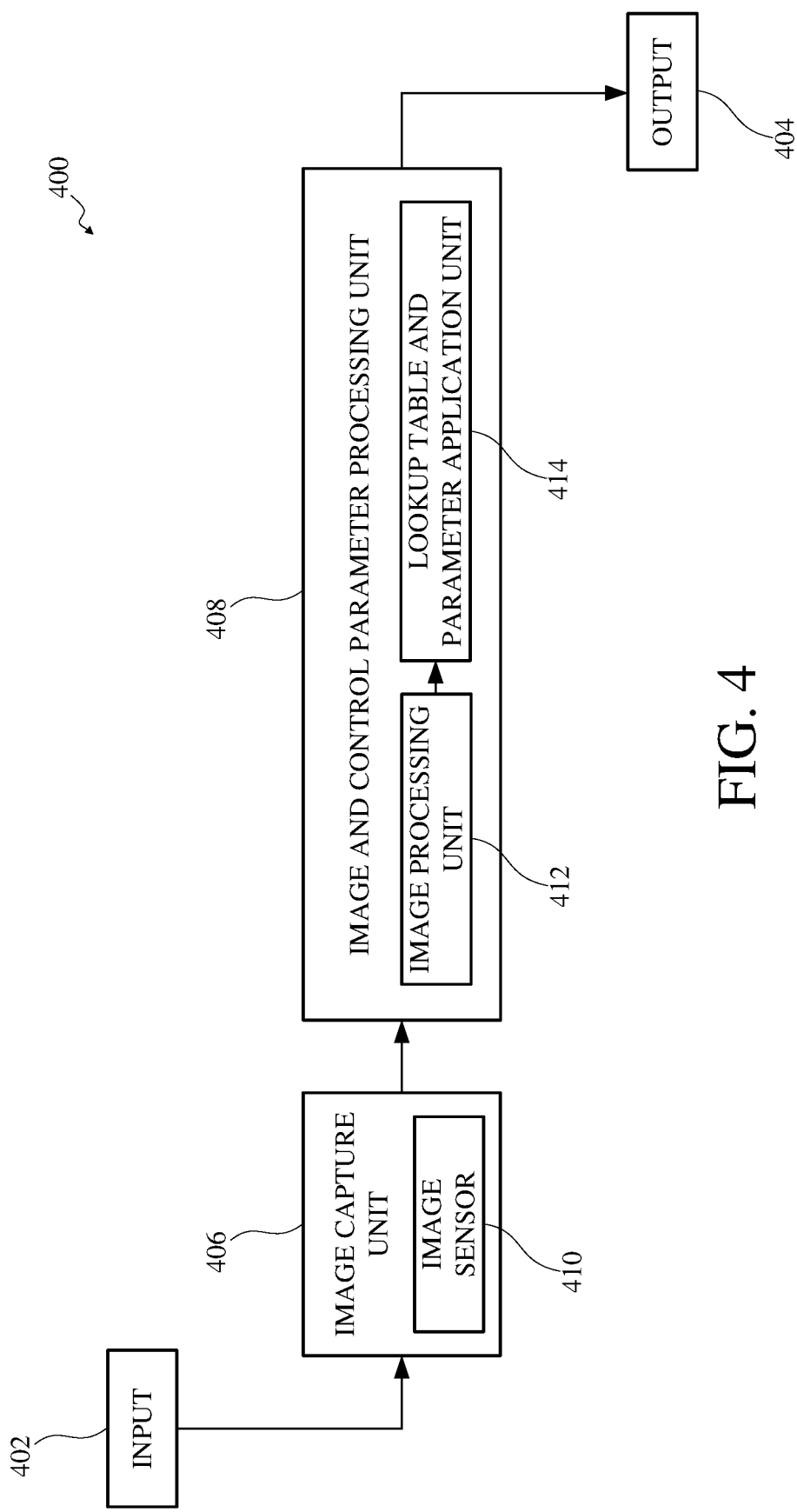
FIG. 4 is a block diagram of an example of an image processing and coding pipeline.

FIG. 4 is a block diagram of an example of an image processing and coding pipeline 400. The image processing and coding pipeline 400 may be included in an image capture device, such as the image capture device 100 shown in FIGS. 1A-D or the image capture device 200 shown in FIG. 2. Alternatively, or additionally, the image processing and coding pipeline 400 may represent functionality of an integrated circuit, for example, including an image capture unit, an image and control parameter processing unit, or a combined image capture unit and image and control parameter processing unit.

The image processing and coding pipeline 400 receives input 402 and processes the input 402 to produce output 404 using an image capture unit 406 and an image and control parameter processing unit 408. The input 402 includes information or measurements usable to capture an image using the image capture unit 406. For example, the input 402 may include measurements and/or other information used by an image sensor 410 of the image capture unit 406 to capture an image. The output 404 is an image captured using the image capture unit 406 and processed using the image and control parameter processing unit 408.

The image sensor 410 may, for example, be one or more of an image sensor of the image capture device 100, an image sensor of the image capture device 200 (e.g., the image sensor 240 or the image sensor 242), an image sensor of the image capture device 300 (e.g., the first image sensor 314 or the second image sensor 316), or an image sensor of the image capture device 330 (e.g., the first image sensor 342 or the second image sensor 344). In some implementations, the image capture unit 406 may include additional components beyond the image sensor 410. For example, the image capture unit 406 may refer to one or more components used to capture an image by the image capture device 100, the image capture device 200, the image capture device 300, or the image capture device 330.

The image and control parameter processing unit 408 processes the image captured using the image capture unit 406 using multi-level LUTs. The image and control parameter processing unit 408 includes an image processing unit 412 and a LUT and parameter application unit 414. The image processing unit 412 performs image processing against the image captured using the image capture unit 406, such as to divide the image into a number of blocks each including a number of pixels. For example, the image processing performed by the image processing unit 412 may be one or more of global tone mapping, local tone mapping, or multiple tone control. Performing the image processing can include applying an edge preserving filter against blocks of the image to separately identify low frequency information and high frequency information of those blocks.

The LUT and parameter application unit 414 applies control point values stored within LUTs to pixels of blocks of the image, such as to produce the output 404 as a processed image. Applying the control point values includes querying or otherwise accessing a first LUT that stores first control point values. The first control point values are applied against each of the blocks of the image to produce distorted image blocks. The distorted image blocks emphasize the pixels within the image for which fine grain control for processing is important.

Applying the control point values then includes querying or otherwise accessing a second LUT that stores second control point values. The second control point values are applied against at least one pixel of a given distorted image block to produce a processed pixel. The second LUT is one of a plurality of second LUTs that are each associated with one block of the image. Thus, while the first LUT may be used for each block, each second LUT may be used with a single block alone. Each of the second LUTs includes stores fewer parameters than the first LUT. Thus, the second control point values includes fewer values than the first control point values. The processed pixels produced for block are used to produce a processed image as the output 404.

In some implementations, histogram collection can be performed in place of the parameter application described above. In some implementations, the pipeline 400 can be used for 3D LUT collection. For example, for a color input R, G, B, there are three first level LUTs (e.g., one for each of the color inputs). Distorted values are computed as R'=LUT1(R), G'=LUT3(G), and B'=LUT2(B). A 3D LUT is then used to process R', G', and B' as a triplet to get R", G", B"=3DLUT(R', G', B'). The advantage is the cost of the 3D LUT, which is the product of the number of control points on each color. For example, where there are 64 control points for each color input in which a fixed step is necessary or desired, but only 16 if variable steps can be used, the 3D LUT can be processed according to the implementations of this disclosure with a cost of 64*3+(16*16*16)=4,288, whereas a cost for typical processing of this 3D LUT is 64*64*64=262,144.

Figure 5:
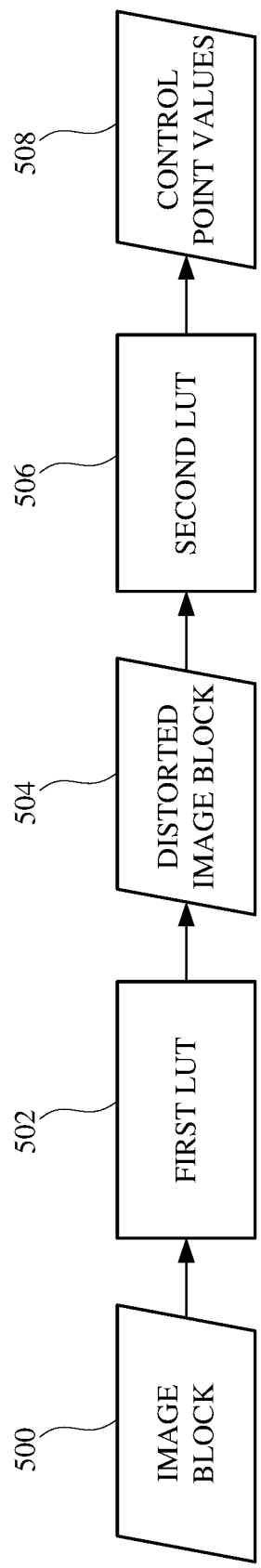
FIG. 5 is a diagram of an example of a data sequence based on processing using multi-level LUTs.

FIG. 5 is a diagram of an example of a data sequence based on processing using multi-level LUTs. The sequence begins with an image block 500, which may be a block of an image captured using an image sensor (e.g., the image sensor 410 shown in FIG. 4). A first LUT 502 is used to produce a distorted image block 504 based on the image block 500. Using the first LUT 502 to produce the distorted image block 504 includes identifying a set of control point values stored within the first LUT 502 and applying those control point values to the image block 500. The distorted image block 504 emphasizes the pixel values within the image block 500 at which fine control is important.

A second LUT 506 is then used to process the distorted image block 504, such as to encode the distorted image block 504. The second LUT 506 includes control point values 508, which correspond to the image block 500. For example, the second LUT 506 may be one of a plurality of second LUTs, each of which corresponds to an individual block within the image captured using the image sensor. Encoding the distorted image block 504 includes applying the control point values 508 against a pixel of the distorted image block 504. The second LUT 506 includes fewer control point values than the first LUT 502.

Figure 6:
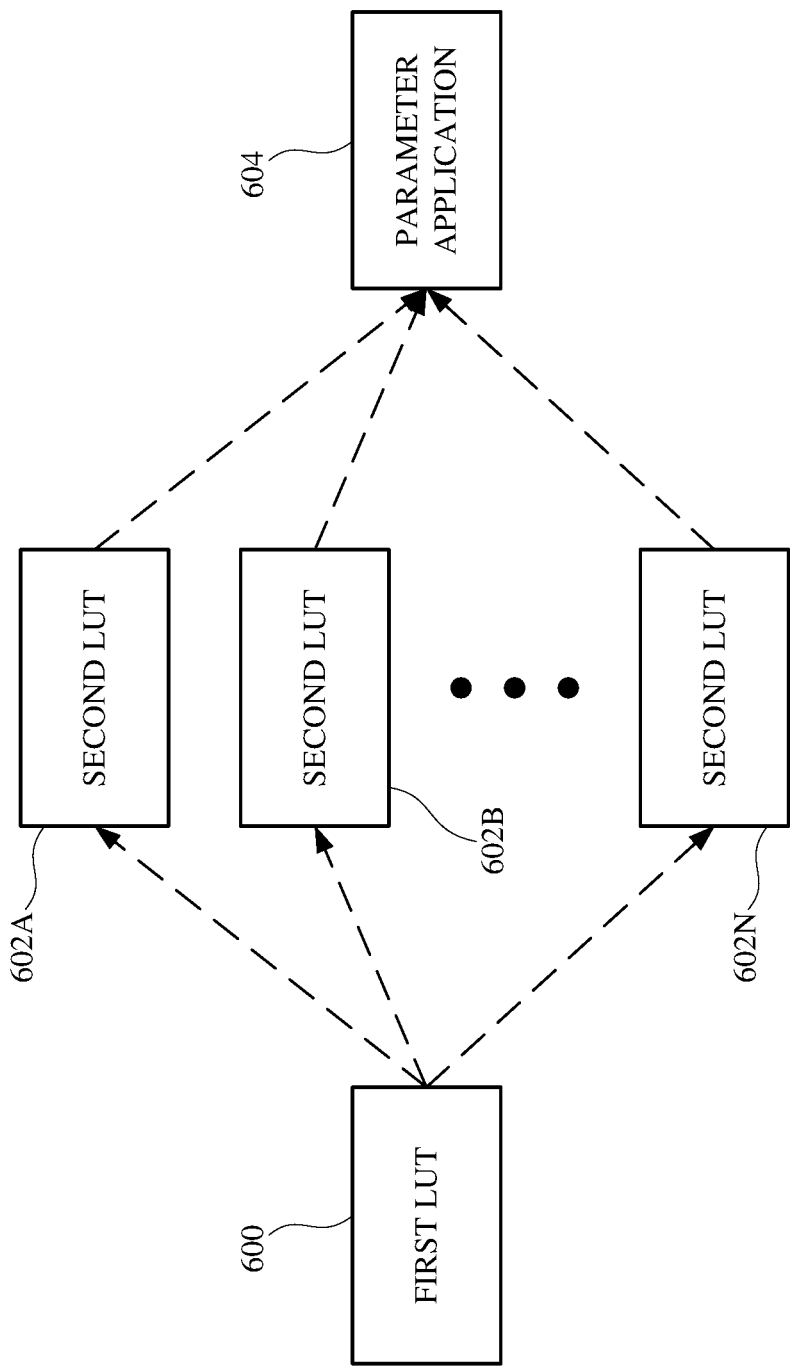
FIG. 6 is a diagram of an example of LUT selection and parameter application using multi-level LUTs.

FIG. 6 is a diagram of an example of LUT selection and parameter application using multi-level LUTs. A first level of the multi-level system includes a first LUT 600, which may, for example, be the first LUT 502 shown in FIG. 5. The first LUT 600 is used to process one or more blocks of an image, such as to produce distorted image blocks. Thereafter, one second LUT of a plurality of second LUTs 602A, 602B . . . 602N is selected, where N represents the number of blocks of the image.

The second LUT selected for processing a pixel of a given block is selected based on a bilinear interpolation of blocks adjacent to that given block within the image. After the second LUT (e.g., one of the plurality of second LUTs 602A, 602B, . . . 602N) is selected, control point values stored in the selected second LUT are applied by a parameter application unit 604, which may, for example, be the LUT and parameter application unit 414 shown in FIG. 4 or a portion thereof. Applying the parameters using the parameter application unit 604 includes identifying second LUTs of each adjacent block of the given block. That is, a distorted pixel of the given block is processed through the second LUT of each of one or more blocks adjacent to the given block. The resulting values are processed using bilinear interpolation based on the position of the distorted pixel to produce a processed pixel.

Figure 7:
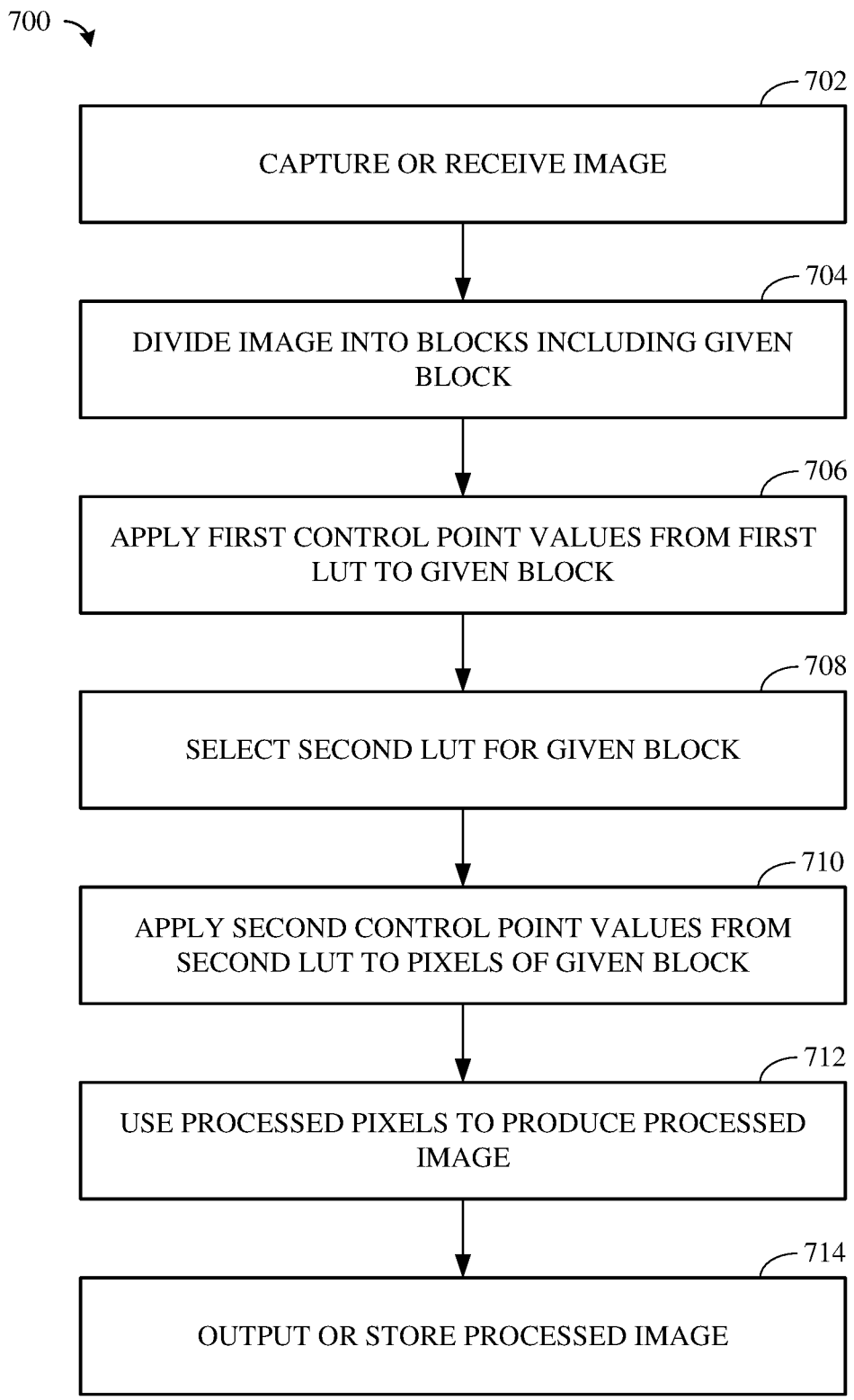
FIG. 7 is a flowchart showing an example of a technique for image processing using multi-level LUTs for control point processing and histogram collection.

Further details of implementations and examples of techniques performed using the systems and pipelines described with respect to FIGS. 1A-6 are now described. FIG. 7 is a flowchart showing an example of a technique 700 for image processing using multi-level LUTs for control point processing and histogram collection. The technique 700 can be performed, for example, using hardware and/or software components of an image capture system, such as the image capture device 100 shown in FIGS. 1A-D or the image capture device 200 shown in FIG. 2. For example, the image capture device 100 or the image capture device 200 may include one or more software components that process an image captured using an image capture device of the image capture device 100 or the image capture device 200, for example, using multi-level LUTs for control point processing and histogram collection, such as described in the pipeline 400 shown in FIG. 4.

In another example, the technique 700 can be performed using an integrated circuit. The integrated circuit may, for example, be a field programmable gate array (e.g., FPGA), programmable logic device (PLD), reconfigurable computer fabric (RCF), system on a chip (SoC), ASIC, and/or another type of integrated circuit. An image processor of the integrated circuit may, for example, include an image capture unit and/or an image and control parameter processing unit (e.g., either, a processor having one or multiple cores) configured to execute instructions to perform some or all of the technique 700.

Although the technique 700 is described with respect to a series of operations, the operations comprising the technique 700 may be performed in orders other than those described herein. In some implementations, the technique 700 may include additional, fewer, or different operations than those described herein.

At 702, an image is captured or received. For example, the image may be captured using an image sensor of an image capture unit of an image capture device. In another example, the image may be received from an image capture device or from a storage. At 704, the image is divided into blocks including a given block. Dividing the image into blocks includes performing image processing against the image. The image processing may, for example, include one or both of local tone mapping or multiple tone control. Performing the image processing includes applying an edge preserving filter against the given block to separately identify low frequency information of the given block and high frequency information of the given block.

At 706, first control point values stored in a first LUT are applied to the given block. Applying the first control point values includes applying the first control point values against one or more pixels of the given block to produce a distorted image block. The distorted image block emphasizes pixel values within the given block for which further processing using fine grain control is important.

At 708, a second LUT is selected. Selecting the second LUT included performing a bilinear interpolation against pixels in the centers of blocks adjacent to the given block within the image. For example, since each of the blocks corresponds to one of a plurality of second LUTs, the bilinear interpolation includes interpolating values stored within multiple ones of the second LUTs to select the second LUT for processing the distorted image block.

At 710, second control point values stored in the second LUT are applied to one or more pixels of the distorted image block to produce processed pixels. Applying the second control point values includes applying at least some of the second control point values against a pixel of the distorted image block to produce a processed pixel. This is repeated for some or all pixels of the distorted image block.

At 712, the processed pixels are used to produce a processed image. For example, producing the processed image using the processed pixels can include combining the processed pixels into the processed image, such as based on the two-dimensional locations of the corresponding original pixels within the original image. In another example, producing the processed image using the processed pixels can include modifying the original image by replacing individual ones of the original pixels within the original image with corresponding ones of the processed pixels. At 714, the processed image is output or stored.

In some implementations, the technique 700 can be performed to collect a histogram in place of applying parameters. In some implementations, the technique 700 can be performed to collect a 3D LUT in place of applying parameters.

Where certain elements of these implementations may be partially or fully implemented using known components, those portions of such known components that are necessary for an understanding of this disclosure have been described, and detailed descriptions of other portions of such known components have been omitted so as not to obscure this disclosure.

In the present specification, an implementation showing a singular component should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared, or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smartphones, personal integrated communication or entertainment devices, or another device capable of executing a set of instructions.

As used herein, the term "computer program" or "software" is meant to include any sequence of machine-cognizable steps which perform a function. Such program may be rendered in any programming language or environment including, for example, C/C++, C#, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include FPGAs, PLDs, RCFs, SoCs, ASICs, and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), DRAM, Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of DSPs, reduced instruction set computers (RISCs), general-purpose complex instruction set computing (CISC) processors, microprocessors, gate arrays (e.g., field programmable gate arrays (FPGAs)), PLDs, RCFs, array processors, secure microprocessors, ASICs, and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, Cellular Digital Packet Data (CDPD), satellite systems, millimeter wave or microwave systems, acoustic, infrared (i.e., IrDA), and/or other wireless interfaces.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of this disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within this disclosure.

While the above-detailed description has shown, described, and pointed out novel features of this disclosure as applied to various implementations, it will be understood that various omissions, substitutions, and changes in the form and details of the devices or processes illustrated may be made by those skilled in the art without departing from this disclosure. The foregoing description is in no way meant to be limiting, but rather should be taken as illustrative of the general principles of the technology.

What is claimed is:

1. An image capture apparatus, comprising:
an image sensor configured to capture an image;
a processor; and
a memory including instructions executable by the processor to:
divide the image into a plurality of blocks including a given block, the given block including pixels;
apply first control point values against at least some of the pixels of the given block to produce a distorted image block, the first control point values stored within a first lookup table;
determine a histogram bin precision for pixels of the distorted image block based on a value distribution of the distorted image block;
select a second lookup table from a plurality of second lookup tables based on the histogram bin precision, the second lookup table storing fewer control point values than the first lookup table;
apply second control point values against a pixel of the distorted image block to produce a processed pixel, the second control point values stored within the second lookup table;
produce a processed image using the processed pixel, the processed image corresponding to the image captured using the image sensor; and
output the processed image for storage or display.

2. The image capture apparatus of claim 1, wherein the instructions to divide the image into the plurality of blocks including the given block include instructions to:
perform image processing against the image to separately identify low frequency information of the given block and high frequency information of the given block.

3. The image capture apparatus of claim 2, wherein the instructions to perform the image processing against the image to separately identify the low frequency information of the given block and the high frequency information of the given block include instructions to:
apply an edge preserving filter against the given block.

4. The image capture apparatus of claim 2, wherein the image processing includes using one or more of global tone mapping, local tone mapping, or multiple tone control.

5. The image capture apparatus of claim 2, wherein the first control point values are used based on the low frequency information of the given block, wherein the second control point values are used based on the high frequency information of the given block.

6. The image capture apparatus of claim 1, wherein the histogram bin precision indicates that a first bin corresponds to a first value range and a second bin corresponds to a second value range, and wherein the first value range and the second value range are different.

7. The image capture apparatus of claim 6, wherein the histogram bin precision indicates that a step of value ranges for bins of the histogram is other than a constant step.

8. The image capture apparatus of claim 1, wherein the first lookup table and at least one second lookup table of the plurality of second lookup tables is a three-dimensional lookup table.

9. An image processor, comprising:
a first unit configured to capture an image;
a second unit configured to perform image processing against the image to divide the image into blocks including pixels; and
a third unit configured to apply control point values stored within lookup tables to at least some pixels of at least some of the blocks to produce a processed image,
wherein, for a given block of the blocks, the third unit is configured to apply first control point values stored within a first lookup table against at least some of the pixels of the given block to produce a distorted image block,
wherein the third unit is configured to apply second control point values stored within a second lookup table against a pixel of the distorted image block to produce a processed pixel, wherein the second control point values include fewer values than the first control point values, and wherein the second lookup table is selected based on a histogram bin precision for the pixels of the distorted image block,
wherein the second lookup table is one of a plurality of second lookup tables, wherein different second lookup tables are used for different blocks of the blocks, wherein the blocks are processed using the first lookup table and a corresponding one of the plurality of second lookup tables, and
wherein the processed image is produced using the processed pixel.

10. The image processor of claim 9, wherein the second unit is configured to perform the image processing against the image to separately identify low frequency information of the given block and high frequency information of the given block.

11. The image processor of claim 10, wherein, to perform the image processing against the image to separately identify the low frequency information of the given block and the high frequency information of the given block, the second unit is configured to apply an edge preserving filter against the given block.

12. The image processor of claim 10, wherein the image processing includes using one or more of global tone mapping, local tone mapping, or multiple tone control.

13. The image processor of claim 10, wherein the first control point values are used based on the low frequency information of the given block, wherein the second control point values are used based on the high frequency information of the given block.

14. The image processor of claim 9, wherein the histogram bin precision indicates that a first bin corresponds to a first value range and a second bin corresponds to a second value range, and wherein the first value range and the second value range are different.

15. The image processor of claim 14, wherein the histogram bin precision indicates that a step of value ranges for bins of the histogram is other than a constant step.

16. A method, comprising:
dividing an image into a plurality of blocks including a given block;

producing a distorted image block by applying first control point values stored within a first lookup table against pixels of the given block;

producing a processed block by applying second control point values stored in a second lookup table against the pixels of the distorted image block, wherein the second lookup table is selected based on a histogram bin precision for the distorted image block; and producing a processed image based on the processed block.

17. The method of claim 16, wherein the given block is a first block, the second control point values are a first set of second control point values, and the plurality of blocks includes a second block, the method further comprising:

producing a second distorted image block by applying the first control point values against pixels of the second block; and producing a second processed block by applying a second set of second control point values stored in a different second lookup table against the pixels of the second distorted image block, wherein the different second lookup table is selected based on a histogram bin precision for the second distorted image block, and wherein the processed image is produced based on the processed block and the second processed block.

18. The method of claim 16, wherein dividing the image into the plurality of blocks including the given block comprises:

applying an edge preserving filter against the given block and to separately identify low frequency information and high frequency information of the given block, wherein the first control point values are applied against the low frequency information and the second control point values are applied against the high frequency information.

19. The method of claim 16, wherein the histogram bin precision indicates that a first bin corresponds to a first value range and a second bin corresponds to a second value range, and wherein the first value range and the second value range are different.

20. The method of claim 19, wherein the histogram bin precision indicates that a step of value ranges for bins of the histogram is other than a constant step.

* * * * *